US009354249B2

(12) United States Patent
Novak et al.

(10) Patent No.: US 9,354,249 B2
(45) Date of Patent: May 31, 2016

(54) SCANNING ION CONDUCTANCE MICROSCOPY USING PIEZO ACTUATORS OF DIFFERENT RESPONSE TIMES

(71) Applicant: IMPERIAL INNOVATIONS LIMITED, London (GB)

(72) Inventors: Pavel Novak, London (GB); Chao Li, Cambridge (GB); Andrew Shevchuk, London (GB); Victor Petrovich Ostanin, Cambridge (GB); David Klenerman, Cambridge (GB); Yuri Evgenievich Korchev, London (GB); Gregory Frolenkov, Lexington, KY (US); Richard Clarke, Cambridge (GB)

(73) Assignee: IMPERIAL INNOVATIONS LIMITED (GB)

( * ) Notice: Subject to any disclaimer, the term of this patent is extended or adjusted under 35 U.S.C. 154(b) by 354 days.

(21) Appl. No.: 13/953,122

(22) Filed: Jul. 29, 2013

(65) Prior Publication Data

US 2013/0312143 A1    Nov. 21, 2013

(30) Foreign Application Priority Data

Feb. 1, 2008  (GB) .................................. 0801900.2

(51) Int. Cl.
*G01Q 60/44* (2010.01)
*B82Y 35/00* (2011.01)
*G01Q 10/06* (2010.01)

(52) U.S. Cl.
CPC ................ *G01Q 60/44* (2013.01); *B82Y 35/00* (2013.01); *G01Q 10/065* (2013.01)

(58) Field of Classification Search
CPC ..... G01Q 10/02; G01Q 10/04; G01Q 10/045; G01Q 10/06
USPC .......................................................... 850/1–4
See application file for complete search history.

(56) References Cited

U.S. PATENT DOCUMENTS

| | | | |
|---|---|---|---|
| 5,081,353 A | 1/1992 | Yamada et al. | |
| 5,414,690 A * | 5/1995 | Shido ..................... | G01Q 10/02 369/126 |
| 5,415,027 A | 5/1995 | Elings et al. | |
| 5,496,999 A * | 3/1996 | Linker ................... | G01Q 10/04 250/307 |
| 5,729,015 A * | 3/1998 | Tong ...................... | G01Q 10/06 73/105 |
| 6,617,569 B2 | 9/2003 | Narita et al. | |
| 2005/0074900 A1 | 4/2005 | Morgan et al. | |
| 2006/0230474 A1* | 10/2006 | Mininni ............... | G01Q 10/065 248/346.01 |
| 2007/0024295 A1* | 2/2007 | Humphris ............. | G01Q 10/06 324/754.17 |

FOREIGN PATENT DOCUMENTS

WO   WO 02-077627   10/2002

OTHER PUBLICATIONS

Korchev, Y.E. et al., "Cell Volume Measurement Using Scanning Ion Conductance Microscopy," *Biophysical Journal*, Jan. 2000, pp. 451-457, vol. 78.
Klenerman, D. et al., "Potential biomedical applications of the scanned nanopipette," *Nanomedicine*, Jun. 2006, pp. 107-114, vol. 1, No. 1.
Stricker, S. "Confocal microscopy of intracellular calcium dynamics during fertilization" *BioTechniques*, 2000, pp. 492-498, vol. 29, No. 3.

* cited by examiner

*Primary Examiner* — Brooke Purinton
(74) *Attorney, Agent, or Firm* — Saliwanchik, Lloyd & Eisenschenk

(57) ABSTRACT

A method for interrogating a surface using scanning ion conductance microscopy (SICM), comprising the steps of:
  a) repeatedly bringing a SICM probe into proximity with the surface at discrete, spaced locations in a region of the surface and measuring surface height at each location;
  b) estimating surface roughness or other characteristic for the region based upon the surface height measurements; and
  c) repeatedly bringing the probe into proximity with the surface at discrete, spaced locations in the region, the number and location of which is based upon the estimated surface roughness or other characteristic in the region, and obtaining an image of the region with a resolution adapted to the surface roughness or other characteristic.

6 Claims, 9 Drawing Sheets

SCANNING ION CONDUCTANCE MICROSCOPY USING PIEZO ACTUATORS OF DIFFERENT RESPONSE TIMES

CROSS-REFERENCE TO RELATED APPLICATIONS

The present application is a continuation of U.S. application Ser. No. 12/864,302, filed Jan. 18, 2011, which is the National Stage of International Application Number PCT/GB2009/050092, filed Feb. 2, 2009, each of which is hereby incorporated by reference herein in its entirety, including any figures, tables, nucleic acid sequences, amino acid sequences, or drawings.

FIELD OF THE INVENTION

This invention relates to scanning ion conductance microscopy, and its use in the study of soft surfaces and interfaces, including those of cells and convoluted matrix structures.

BACKGROUND TO THE INVENTION

Soft surfaces are a feature of many natural phenomena, particularly when immersed in liquid, including cell membranes and immiscible liquid droplets. Many imaging and measurement techniques used for the study of such surfaces employ a probing method that applies forces which may induce errors by disturbing the surface under observation or which require modification of the surface before such observation can be carried out.

The cell is the most fundamental unit of living organisms, whether animal or plant. The study of its structure and composition, and how its various constituents function, lends valuable insight into the complex processes that occur in integrated biological systems. This requires techniques that allow investigation of cell samples to be conducted in real-time, non-invasively, and in solutions that mimic physiological conditions so that cell functionality is retained.

Optical microscopy (using visible light) has been applied widely to study live cells. However, the resolution is limited by diffraction to about 200-250 nm. For more detailed study, one commonly used method is electron microscopy, where it is possible to obtain images with 10 nm resolution, but the sample needs to be fixed prior to imaging. Hence, it is not possible to use an electron microscope to study living cells.

Another possible high resolution technique is based on the use of scanning probe microscopy (SPM), in which a sharp probe tip is scanned in close proximity to the sample under study. The consequent interactions and thus the chemical/physical properties of the sample can be plotted as a function of the tip's position with respect to the sample, to generate a profile of this measured interaction. Members of the SPM family that are commonly applied to biological imaging are atomic force microscopy (AFM), scanning ion-conductance microscopy (SICM) and scanning near-field optical microscopy (SNOM).

Atomic force microscopy (AFM) is commonly used to study the response of a surface to mechanical force or pressure. When using AFM, the tip cantilever spring constant affects how much the surface under study will be displaced by the measurement or detection process and sets a limit to the softness of a surface which can be studied. An additional difficulty with AFM when used in contact or tapping mode is the likelihood of the surface adhering to the probe tip, altering the measurements during retraction and leading to contamination of the tip and mechanical damage to the surface.

In other cases the environment required by the probing method requires modification of the surface before imaging, as with electron microscopy where the need for a vacuum or low pressure gas may require stabilization of the surface and removal of liquid before imaging may be carried out.

Scanning ion conductance microscopy (SICM) is a form of scanning probe microscopy (SPM) that allows the high resolution imaging of soft surfaces without any contact or force interaction whatsoever and in the normal liquid environment of the subject. In SICM, typically an electrolyte-filled, glass micropipette is scanned over the surface of a sample bathed in an electrolytic solution; see Hansma et al (1989) Science 243:641-3. A quartz pipette may also be used. WO-A-00/63736 discloses that SICM can be used effectively, e.g. to scan the surface of a live cell by controlling the position of such a probe. This is achieved by adjusting the distance of the tip of the micropipette from the surface so as to maintain the current at a constant value, typically that which keeps the probe at a distance of some nanometers from it. The pipette-sample separation is maintained at a constant value by monitoring the ion-current that flows via the pipette aperture. The flow is between two electrodes: one inside the pipette and another outside in the electrolyte solution. For an applied bias between the electrodes, the ion-current signal depends on a combination of the micropipette's resistance ($R_P$) and the access resistance ($R_{AC}$) which is the resistance along the convergent paths from the bath to the micropipette opening. $R_P$ depends on the tip diameter and cone angle of the micropipette, whereas $R_{AC}$ displays complicated dependence on the sample's electrochemical properties of the bath and the sample, geometry and separation from the probe. It is $R_{AC}$ that lends ion-current sensitivity to the pipette-sample separation and allows its exploitation in maintaining the distance such that contact does not occur.

The optimum tip-sample separation that has allowed SICM to be established as a non-contact profiling method for elaborated surfaces, is approximately one-half of the tip diameter; see Korchev et al (1997), J. Microsc. 188:17-23, and also Biophys. J. 73:653-8. The outputs of the system controlling the position of the tip are used to generate images of topographic features on the sample surface. The spatial resolution achievable using SICM is dependent on the size of the tip aperture, and is typically between 50 nm and 1.5 µm. This produces a corresponding resolution.

The sensitivity of the micropipette used in SICM is highest to surfaces directly below the micropipette tip and is less so to surface structures that lie at the sides of the tip. If the micropipette is scanned across a surface whose features are of a similar scale to the diameter of the micropipette tip, the SICM system is able to keep the tip out of contact with the surface. However, if the surface contains features and structures of a height much larger than the tip diameter, and which include steep edges or walls, then the scanning speed on the SICM system must be reduced in order to avoid collision, resulting in a longer time spent at each point on the surface. In the extreme, where the target surface is a convoluted structure such as a cluster of interwoven neurons, or a matrix or scaffold within which cells are growing, there is a risk that the micropipette would become entangled and that the SICM system would be unable to scan.

WO-A-00/63736 discloses a method by which the probe is scanned across the surface at a fixed speed or rate. Other methods are known in which the time spent by the probe at any point is varied to allow the probe ion current and vertical position to stabilise within a given range. In all of these methods, however, the resolution of the scan or density of points measured during the scan, as represented by the number of points measured per scan line and the number of lines scanned per image, is constant throughout that scan. As a result, an increase in the time spent at each point leads to a proportionate increase in the total scan time. The time to generate a high resolution image of a convoluted surface may become so long as to be prohibitive.

Previous methods to confine the scan to the most relevant region have been based on optical microscopic surveys, including computer analysis of the resulting images (NASA/TM-2004-213383). This approach can be complementary, but is limited to a resolution governed by the wavelength of the light.

Mann et al, J. Neuro. Methods, 2003; 116: 113-117, discloses the technique of pulse-mode scanning ion-conductance microscopy. This is used to control the distance between the SCIM probe and the surface. The technique uses constant current pulses to monitor the change in resistance.

Happel et al, J. Microscopy, 2003; 212: 144-151, discloses the use of a pulse-mode scanning ion conductance microscopy to observe volume changes and cell membrane movements during the locomotion of cultured cells. The microscope apparatus uses current pulses to control the difference between the cell surface and the electrode tip as well as a back-step to prevent contact of the tip with the cell membrane during lateral movements of the probe. The apparatus is used with a constant resolution to determine areas having high surface structures. Lateral scans can then be performed at different heights depending on the expected height of the surface structures. Although this method has advantages, it still results in low scan speeds.

SUMMARY OF THE INVENTION

According to the present invention there is provided a method for interrogating a surface using scanning ion-conductance microscopy (SICM), comprising the steps of:
a) repeatedly bringing a SICM probe into proximity with the surface at discrete, spaced locations in a region of the surface and measuring surface height at each location;
b) estimating surface roughness or other surface characteristics for the region based upon the surface height measurements; and
c) repeatedly bringing the probe into proximity with the surface at discrete, spaced locations in the region, the spacing of the locations being based upon the estimated surface roughness or other surface characteristic in the region, and obtaining an image of the region with a resolution adapted to the surface roughness or other surface characteristic.

According to a preferred embodiment of the present invention, the method includes sampling the surface to be scanned by SICM to ascertain which areas are of most relevance to the investigator. The SICM micropipette is cycled in height above the surface, with amplitude which is greater than the maximum hill valley distance, at discrete points across the surface. To avoid collision or entanglement of the micropipette tip during lateral movement between the discrete points, the micropipette is moved laterally only while distant from the surface. No lateral movement of the micropipette which could damage the surface or tip takes place while the tip is close to the surface.

In the preferred embodiment the sampling takes place at four boundary corner points for each square region of the surface. By analysis of height measurements from the initial four points, an estimate of surface roughness for the region can be determined. The scanning probe (e.g. SICM micropipette) is then cycled in height above the surface at a number of points within the square, the number of points being selected based upon e.g. the estimated surface roughness. This analysis would be ongoing for subsequent points to provide for a final scan over only the region or regions with structures of interest, and within that region or regions to produce an image whose resolution is adapted locally to the surface complexity.

Although surface roughness is described as the criterion for the adaptive scanning, to determine the number of pixels imaged in each square on the surface, other criteria could be used depending on the biological question of interest. For example, the presence of a fluorescence signal could be used as a surface characteristic, to increase imaging resolution.

Apparatus for enacting the method of the present invention comprises a SICM apparatus, including a scanning probe (micropipette), means for measuring and/or controlling the distance of the probe tip from a surface to be scanned, and means for moving the probe laterally relative to the surface.

In the preferred embodiment of the invention, the method includes the following steps:
(i) Optics and observation of change or modulation of the ion current through the tip of the probe are used to bring the tip to a controlled distance from the surface.
(ii) In repeated cycles the probe is retracted some distance from the surface and then advanced back towards the surface at a controlled velocity or rate.
(iii) During each of these repeated cycles, the ion current is observed during the advance towards the surface until the current falls below a preset threshold level, at which time the probe is once again retracted.
(iv) To avoid sideways collision with surface structures, the sideways motion control system is synchronised to the cyclic advancement and retraction of the probe so that such sideways motion is inhibited during the advancement part of the cycle, and for the early part of the retraction.
(v) A region is selected and the probe is used to measure the height of the surface at a few precursor points distributed across that region. As already indicated, if the region is a square, measurement could be made at the four corners of the square.
(vi) The number of additional measurements to be made within the region can be decided by analysing the distribution of heights of the precursor points measured in Step (v). Where all such precursor points are observed to have similar heights, it is reasonable to assume that other points within the region will also have similar heights, and that few or no further points need to be measured. Where a significant variation in height of the precursor points is observed, it may be appropriate to measure the height of additional points distributed across the region in order to determine the shape of the surface within the region with greater fidelity. By not measuring at points estimated to have similar heights and so reducing the total number of points to be measured, the total time to produce an image of the surface may be reduced significantly.

In the preferred embodiment, the height of the probe retraction in any particular region is determined taking into account an estimate of the height range of structures in that region from observation of the variation in heights of the precursor points, with the addition of a safety margin. By minimising the extent of retraction, the time required for a full cycle of retraction and advancement is reduced, so reducing the time taken to measure each point.

During the advance of the probe towards the surface, the motion of the probe may be halted after the current falls below a preset threshold for the first time, for a given time or for a given number of measurement samples. Such additional measurements provide information about the relationship between ion current and distance from the probe to the surface in the region close to that surface. The graphical representation of this relationship is commonly called an "approach curve". In turn, this relationship may indicate characteristics of the surface, including its roughness, its conductivity relative to the surrounding solution, or the degree to which it is normal to the probe axis.

For each advance of the probe towards the surface, the threshold current may be set differently, taking into account the recent level of current while the probe is distant from the surface. This current may be measured immediately prior to the advancement, may be an average of a number of such measurements, or may be an average including such measurements over a number of cycles of retraction. Such adaptation of the threshold may be necessary to take into account factors unrelated to surface distance which might change the current.

Once points in a region have been measured, another region is selected for measurement. If this second region is adjacent to the first region, the data from any previous precursor points that lie on the boundary between these two regions are reused in estimating the height range of the second region. Thus superfluous measurement is avoided. In the case of square regions, where the precursor points in the first region are four corners, the estimation of height range for an adjacent square region would require the measurement of only two additional points.

Once the additional points in any region have been measured, an estimate is made of the height range in sub-regions within that region. If that range is large enough, a subset of the additional points is considered as a new set of precursor points, and measurement made at further, additional points, more closely spaced than the first additional points, to determine the shape of the surface in that sub-region with greater fidelity. This process may be applied recursively until a limit determined by the scanning resolution of the probe and the controlling system.

In a further aspect of the invention, the reduction in ion current as the pipette (probe) approaches the surface is used to determine information about the surface curvature and mechanical properties of the sample at this point. The shape of the reduction in current contains information about both these additional properties of the surface, as well as topography. If the surface is soft the pipette needs to move further down to get the same reduction in ion current since the surface moves away as the pipette approaches, due to forces exerted when the pipette is closer to the surface. The pipette also needs to move further down if the surface is more curved. By analysing the approach curves and optionally doing the approach at the same place at different applied voltages, which will alter the force applied, it is possible to obtain additional information, and hence map these additional properties at the same time. The present invention therefore makes it possible to map other surface properties as well as the sample topography. This may provide more contrast in the obtained image making certain features of interest easier to detect, e.g. the underlying cell cytoskeleton under the cell membrane.

In a further aspect, there is an apparatus for carrying out scanning probe microscopy, comprising:
(i) a scanning probe;
(ii) means for measuring and/or controlling the distance of the tip of the probe from a surface to be scanned;
(iii) means for moving the probe laterally relative to the surface.

wherein the means for measuring and/or controlling the distance of the tip of the probe comprises two piezo actuators of different response times.

It is preferred if the first piezo actuator has a travel range of at least 100 μm and the second piezo actuator has a travel range less than 50 μm, preferably no more than 25 μm.

BRIEF DESCRIPTION OF THE DRAWINGS

A preferred embodiment of the present invention will now be described with reference to the accompanying drawings, in which.

DETAILED DESCRIPTION

Figure 1:
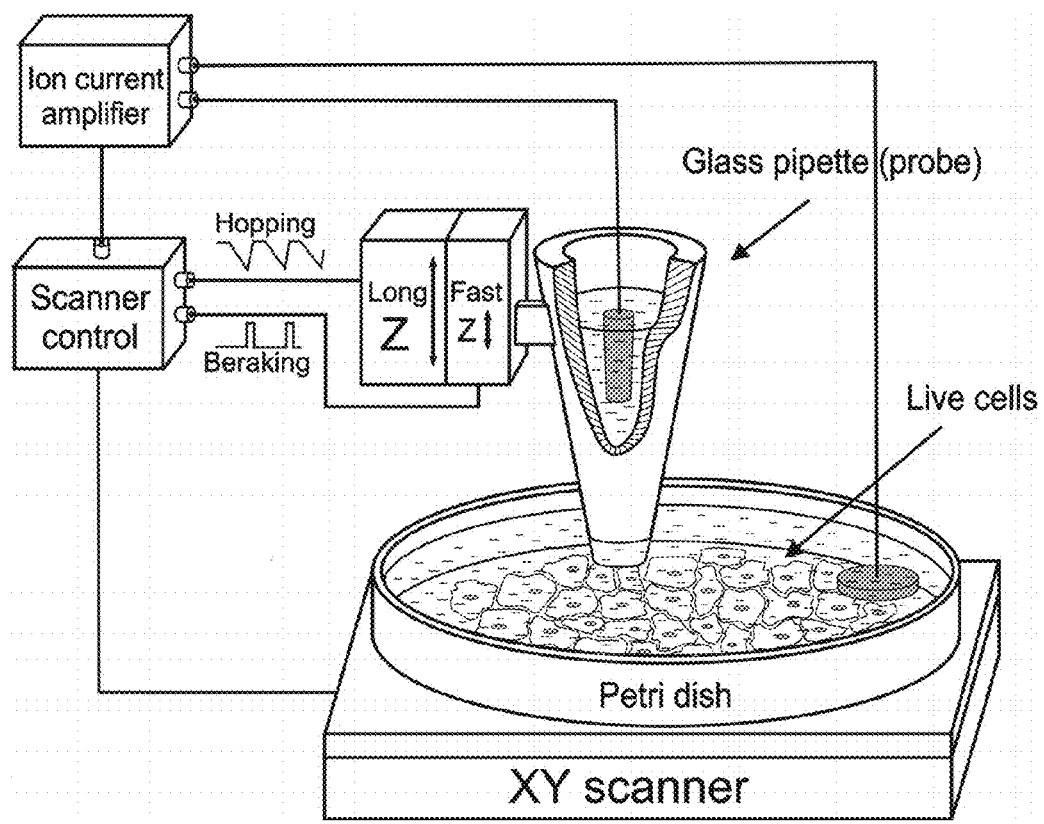
FIG. 1 shows the configuration of a hopping mode SICM system used to investigate a cell surface.

A typical SICM apparatus of the invention comprises a scanning probe, piezo-actuator scanning elements, control electronics and a computer. These components may be built in and around an inverted microscope, e.g. Diaphot 200 (Nikon Corporation, Tokyo, Japan). The piezo-actuator can be used to measure and/or control the distance of the probe tip from the surface to be interrogated and to move the probe laterally relative to the surface.

The term 'interrogate' is intended to refer to the ability to monitor changes at the surface of a structure, e.g. to detect structural changes on or at the surface at a single position or as the probe scans the surface, or to measure the height of a structure. In certain circumstances the surface may be pliable, and allow imaging of structures underneath the surface, e.g. cytoskeleton underneath a cell surface. This is included in the term. It is not intended that the term be restricted to detecting structural changes, and the monitoring of, for example, electrophysiological or chemical changes is also included.

The term "scanning ion-conductance microscopy" (SICM) is known in the art and relates to scanning probe microscopy whereby a probe is maintained at a constant distance from a surface by the measurement of conductance or resistance between the probe and the surface.

In an embodiment of the invention the software of an existing SICM unit is modified so as to drive the z-piezo (vertical) stage to implement the sequences outlined above. The estimate of the amplitude of the preliminary "hopping" interrogation of the surface would be input by the user, and is used by the software to govern the maximum z span of the pipette tip in approaching the initial points on the surface. The height information derived from these probes is fed into the software to calculate the positions of the next set of readings and so on until the region of maximum roughness has been defined, when a normal scan is performed in that region at the required resolution. The "hopping amplitude" is usually greater than 1 µm, typically of the order 1 µm-8 µm, more preferably 2 µm-6 µm, more preferably 3 µm-6 µm, e.g. 5 µm The SICM, the pipette (probe) may be adapted such that, when located in proximity to the surface under study, a localised and controlled pressure or force can be applied to the measurement surface by means of a regulated flow of liquid through the probe. The application of this pressure can be used to measure the flexibility or elasticity of the surface by monitoring the relationship between the applied pressure and the resulting movement of the surface. It can also be used to stimulate cell surface components, e.g. mechanosensitive ion channels, with subsequent measurement of this stimulation carried out by monitoring consequent changes in electrophysiological or chemical signals.

The pressure applied to the surface will, if the surface is sufficiently pliable, cause the surface to move. Positive pressure, i.e. flow through the probe towards the surface, has the effect of pushing the surface away from the probe, increasing the separation between the surface and probe tip. A negative pressure draws the surface towards the probe tip, decreasing the separation. The relationship between the applied pressure and the resulting movement of the surface can therefore provide information on the elasticity of the surface structure.

The probe may be used to scan the surface while simultaneously applying pressure to it. In this way, the invention can be used to build up a detailed picture of the surface as it responds to the applied pressure, to reveal surface and sub-surface structures.

SICM probe images a surface without contact, and it can be operated in a mode that exerts negligible force on the surface. For micropipettes of approximately 100 MegaOhm resistance this is the case when the applied bias to the electrodes is low. At higher applied bias the electric field at the tip of such a micropipette is strong enough that forces due to electrotension in the surrounding media are no longer negligible and are recognised to be strong enough to actuate the constriction of cell membranes (C. Bae, P. Butler Biomech. Model Mechanobiol. 7; 379: 2008). However, this electrotension has the additional effect of exerting a small repulsive force on media of lower static dielectric constant, repelling them from the region of high electric field around the micropipette tip. At low voltages, when the micropipette tip is far from the surface, it is able to image while exerting no such force. However, at higher voltages, or when the micropipette tip is closer to the surface, the higher electric strength gives rise to this small force that repels the surface slightly. Therefore, the difference in these displacements at each point in an image can be exploited to measure the mechanical properties of the sample; its Young's modulus and hysteresis in its movement for example. When the surface is not flat these measured coefficients must be corrected for the local curvature of the surface. This correction is realised technically by measuring at each point the relative displacements between two set percentages of decrease in ion current, first at low voltage where deviation from the expected difference can only be due to curvature in the surface, and then at higher applied electrode bias, where the deviation may be expected to increase because of the electrotensive force pushing the surface away slightly. Moreover, this force can be exploited to constrain the superficial surface against elements underlying it so that these can also be imaged by the micropipette.

The invention can be used to make a simultaneous measurement of a structure when the pipette is far from the surface and when it is close in the "hopping mode" so a differential map of the surface can be obtained by subtracting these two measurements taken shortly after one another. When the pipette is close to the surface it will locally deliver an agonist or ions efficiently to the surface and give a larger response, measured by fluorescence detecting intracellular calcium or whole cell recording of increased calcium channels, the delivery is negligible when it is far away. Alternatively, the pipette can be stopped at the bottom of the hop and apply a voltage pulse (e.g. a short 500 mx-2V pulse) for efficient local delivery—this differential mode can be used to map receptors or mechanosensitive ion channels as outlined below.

Figure 10:
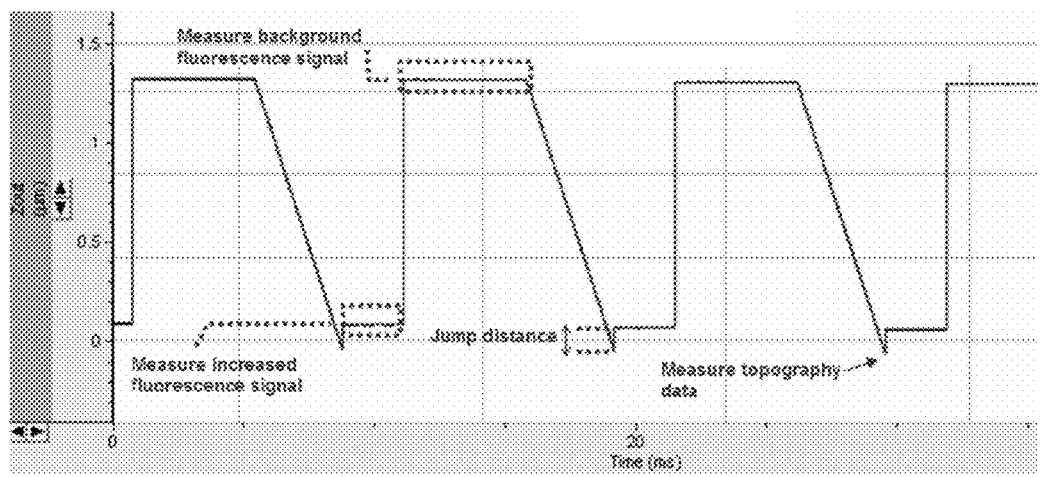
FIG. 10 illustrates probe movement during fluorescence mapping.

FIG. 10 illustrates the fluorescence mapping embodiment. The SCIM probe first measures the background fluorescence signal while the probe is distant to the surface waiting for lateral movement. Next, it approaches the surface and measures the surface topography. The control software may drive the probe (pipette) to jump up a small distance in order to prevent any further piezo movement. The feedback control is on hold and the software measures increased fluorescence signal.

The apparatus can be adopted for simultaneous measurement of cell topography and detection of a fluorescence signal that is excited by a laser beam 5 focused at the tip of the pipette. In contrast to existing technology, this "surface confocal imaging" can be done by using the SICM in a "hopping mode". At each "hopping" step, the level of background fluorescence will be recorded first when the pipette is far from the surface and no force is exerted on the cell. The pipette is then brought to a pre-defined distance from the surface of the cell and both position of the pipette and fluorescence signal will be simultaneously recorded. When a pressure stimulus is applied to the pipette, it may activate mechanotransducer channels that are generally permeable to calcium. This will give rise to increased fluorescence of a calcium-sensitive fluorophore 7 in the cell, such as Fluo-4. This signal can be subtracted from the fluorescence signal when the pipette is far away from the cell surface. Subtracting the background fluorescence will reveal the local changes in fluorescence on application of pressure. This technique will be used to map the position of, for example, MS ion channels in DRG neurons and auditory hair cells.

Accordingly, the "hopping mode" combined with simultaneous fluorescence or whole cell recording or any other simultaneous measurement of the sample can be used to obtain differential maps, map receptors and mechanosensitive ion channels and other properties e.g. local mechanical properties or local chemical groups. Multi-dimensional imaging of surface topography can be achieved and local surface properties or function probed by any agent or stimulus 9 delivered from the pipette. Measuring the response of the surface from this local change with the baseline level of the parameter of interest measured just before or after the bottom of the hop, provides a difference image. This technique could be used in a method to determine how drug candidates affect a receptor or mechanosensitive ion channel response or any agent which alters the response.

In the case of an SICM probe adapted to apply a localised and controlled pressure, the hollow micropipette or nanopipette can be fabricated by pulling borosiliate glass capilliaries with, for example, outer and inner diameters of 1.00 mm and 0.58 mm respectively, using a laser-based micropipette puller (for example model P-2000, Sutter Instrument Co., San Rafael, Calif., USA). Probes with conical taper lengths and apex diameters of 200 nm, 400 nm and 1.0 µM, can be achieved. The pressure can be exerted by conventional means to control the flow of liquid through the probe. Typically, a programmable pressure injector system, for example model PM-4, Warner Instruments, Hamden, Conn., USA, is coupled to the shank of the SICM pipette holder by means of a flexible tube, and the injector programmed to generate the required pressure/time profile. The amount of pressure required can be determined by the skilled person. Typically, a positive pressure of at least 10 kPa, e.g. from 10 to 50 kPa is applied. More typically a pressure of from 13 to 40 kPa is applied. The apparatus may further include means to measure electrophysiological or chemical signals which may be generated by a cell or biological surface and stimulated by the applied pressure. Such measurement means is conventional in SICM.

The basic arrangement of an SICM for topographical imaging of living cells has been described previously (Korchev et al., Biophys. J. 1997a; 73:653-8; Korchev et al., J. Microsc. 1997b; 188 (Pt 1):17-23). Briefly, the SICM uses a patch-clamp nanopipette arranged perpendicularly to the sample as a scanning probe. The pipette is mounted on a three-axis piezo translation stage.

In a traditional line scanning mode the probe approaches the cell surface and scans over it while maintaining a constant tip-sample separation distance, using the SICM feedback control that keeps the ion current through the pipette constant. The SICM controller produces a surface image of the cell, and makes possible a straightforward pipette approach precisely over an identified specific area or structure of the cell, to within approximately 100 nm from the cell membrane.

Whilst traditional line scanning SCIM can be used in both contact and non-contact modes, the contact approach can be of limited use in cell microscopy, as the cells can become easily damaged, or the patch-clamp pipette moved, breaking the high resistance patch due the direct physical contact, and/or disturbance by mechanical stimulation. However, non-contact mechanical stimulation could potentially be repeated indefinitely, as there is no physical contact between the SICM probe and the cell, avoiding damage.

Traditional SICM line scanning can take up to several hours to acquire high resolution images over a large area. Lengthy scanning works fine with fixed samples, however it is not applicable to living biological cells which change their surface formation from time to time. Drifts and stitch effects have been observed between adjacent areas over the scanned living cell surface in images obtained. The long scan time is primarily due to the fact that the same high scan resolution is used throughout the image despite large portions of the scan area of the subject surface being flat, or containing no interesting features. The present invention advantageously reduces the scanning time by spending less time to scan un-interesting features and using the most time to scan interesting areas.

In a preferred embodiment, the apparatus used to carry out the method comprises a second piezo-actuator, to improve the stopping ability of the probe.

There is a physical limitation for the time response of piezo actuators associated with their travel range. Actuators with longer travel range are slower and not capable of faster settling times that can be achieved by shorter travel actuators of the same design. This behaviour is associated with actuator resonant frequency that also drops with travel range. For example a P-753 12 micrometer travel stage has 5.6 kHz resonant frequency, while the 38 micrometer travel version has only 2.9 kHz (Physikinstrumente, Germany).

The hopping probe protocol requires immediate stoppage and withdrawal of the pipette when ion current is reduced to a specified set point. Delaying the stoppage and subsequent pipette withdrawal may result in pipette and/or sample damage due to collision.

A delay may be due to delayed vertical actuator response. In addition, momentum contributes to response delay taking it longer to stop with higher fall (approach) rate therefore making faster imaging difficult. In order to overcome this, an additional piezo actuator of shorter travel range may be used, as shown in FIG. 1. The additional actuator has a faster response time in order to stop and withdraw the probe fast enough to allow ion current to recover to the initial (reference) value without excessive drop. This should minimize the chances of collision within the surface and enable faster imaging while retaining a long vertical travel range that is necessary to cope with tall samples. FIG. 1 is a schematic diagram of the scanner where two piezo actuators are combined in order to serve as one long travel high speed actuator.

Although the combined vertical actuator presented in FIG. 1 is intended to be operated in hopping probe mode it can be used for conventional DC or modulated scanning.

Using this configuration, there is no prolonged excessive ion current reduction. This is achieved by efficient withdrawal of the probe by the fast short-travel range piezo-actuator. The fast piezo receives a pulse of driving signal that is generated by hopping probe control software immediately after the ion current reaches a specified set point.

Figure 8:
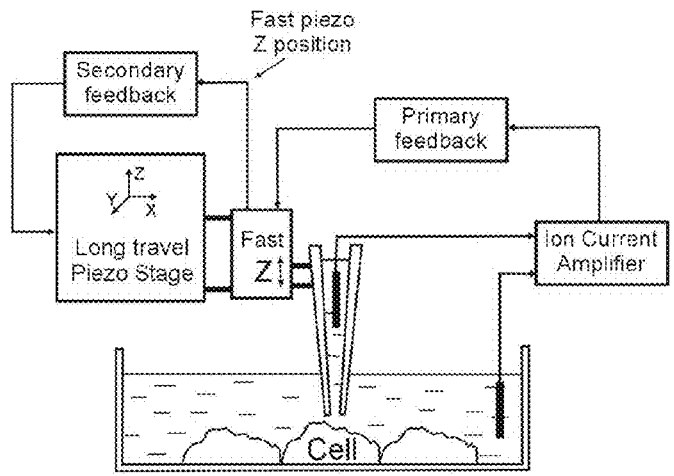
FIG. 8 shows the configuration of a SICM system having primary and secondary feedback systems.

If a combined vertical actuator system is used in DC or modulated scanning, two separate feedback controls are used. Primary feedback that has ion current as an input signal works as a SICM standard feedback and has its output connected to drive a fast short-travel piezo-actuator. The secondary feedback uses a fast piezo-actuator position as an input signal and by adjusting the long travel actuator position brings the fast actuator to its middle range (see FIG. 8).

It is also possible to use the combined vertical actuator in the hopping probe mode when, at every measurement position, the system does not simply acquire one height measurement with subsequent withdrawal of the probe, but rather stops the long travel actuator and allows some time for the fast piezo actuator to feedback and perform a more accurate measurement of height. This hybrid hopping probe and standard continuous feedback mode allows higher vertical accuracy to be achieved.

Figure 3:
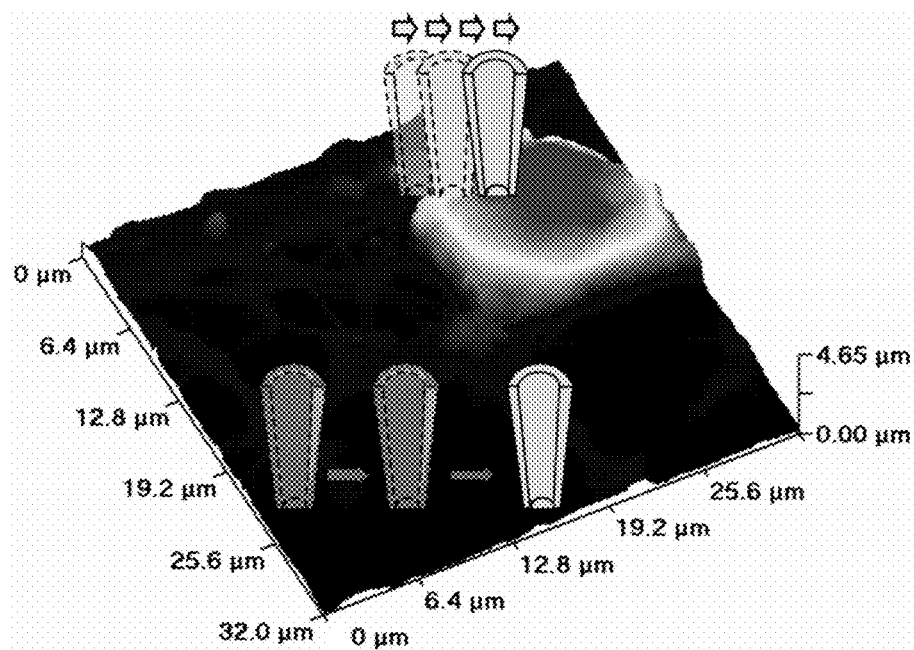
FIG. 3 shows different scan resolutions for different regions of a surface.

In a preferred embodiment, the present invention uses a scanning protocol developed to scan a subject surface with multiple resolutions. It scans interesting features with high resolution (slower scan) and low resolution (quicker scan) for un-interesting ones. FIG. 3 shows an image generated according to the principles of the present invention in which the flat, un-interesting region in the lower portion of the image has been scanned at low resolution, whereas the rough, interesting region in the upper portion of the image has been scanned at high resolution. When compared with traditional line scanning, a reduction in scan time of at least 50 percent can be achieved using the present invention. This therefore allows cells to be imaged at higher resolution than has previously been possible.

Square Scanning

Instead of traditional line scanning, the entire surface to be imaged is divided into a number of individual squares. These squares can each be imaged at different resolutions and so the resultant image has multiple resolutions. The square size is in pixels where each pixel is also used as an imaging point. The square sizes used were 4×4, 6×6, 8×8, 16×16 and 32×32 pixels. The image size is fixed to 512×512. The entire surface to be imaged is scanned by imaging individual squares one by one. A 32×32 square forms 16 squares in a row and 16 lines to give 256 squares in the whole image. If a 4×4 square is used this yields 128 squares in a row and 128 lines, giving 16384 squares in the whole image.

Compression Level

Figure 4:
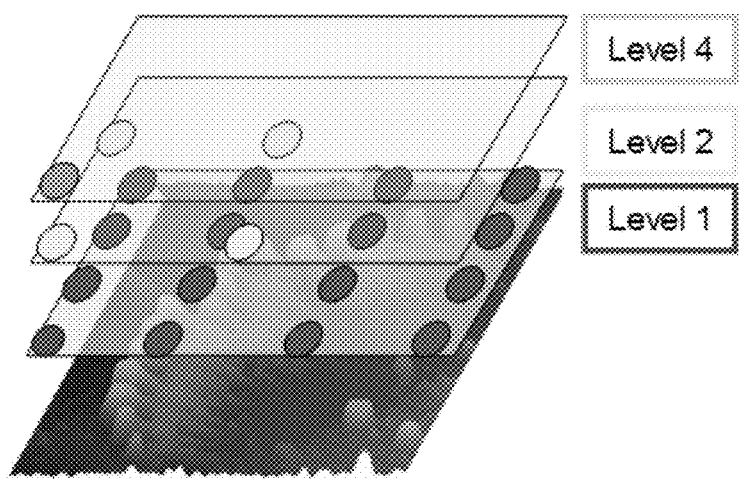
FIG. 4 shows different compression levels for a region.
Figure 9:
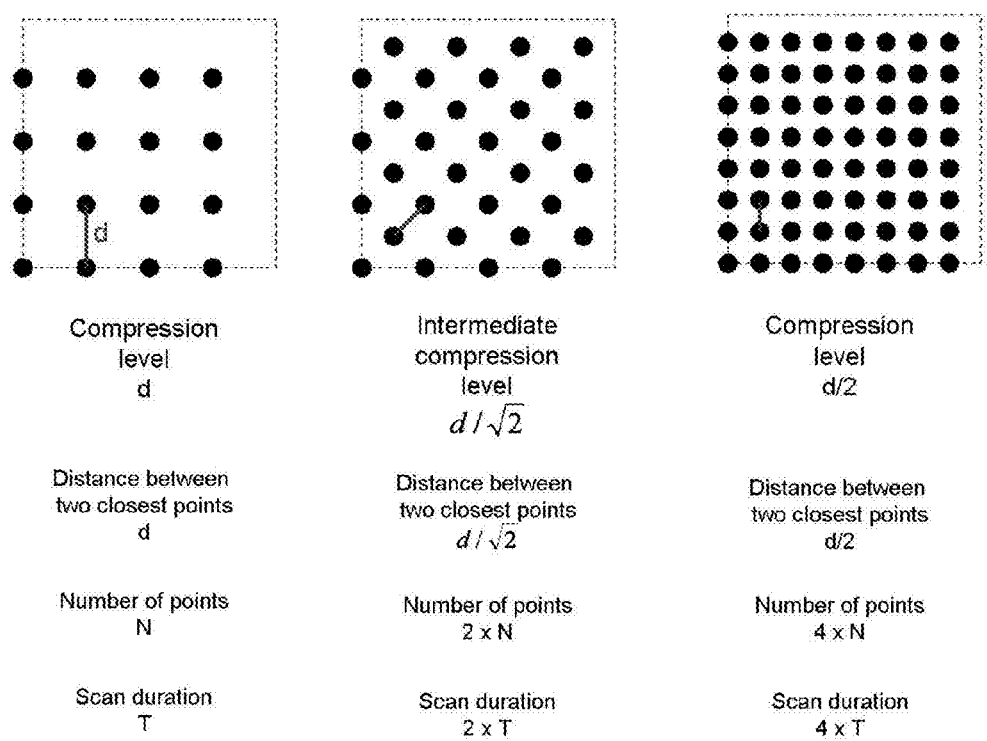
FIG. 9 shows different compression levels utilised in the invention.

Compression levels determine imaging resolutions. Higher compression levels give higher compression and therefore lower resolution. However, it takes less imaging points and less scanning time. The compression levels used are: 1, 2, 4, 6, 8, 16 and 32. These levels are also in pixels; compression level 1 means image every pixel; level 4 means imaging 1 pixel for every 4 pixel. A square cannot have compression level higher than its side length. A 32×32 square can use any compression levels up to 32, whereas a 4×4 square can only use compression levels up to 4. For instance, if a 4×4 square is used as shown in FIG. 4, compression level 1 scans every pixel in the square and provides 16 image points; compression level 2 scans every 2nd pixel in the square and provides 4 image points; compression level 4 scans every 4th pixel in the square and provides 1 image point. Reducing compression by one standard level doubles the resolution but quadruples the duration of scan. Introduction of additional "intermediate" compression levels (see FIG. 9) between each pair of the standard compression levels allows finer control over the resolution and scanning speed. An intermediate compression level $d/\sqrt{2}$ is created by overlaying two grids of measurement points corresponding to compression level d, displaced one from another by d/2 pixels in both x and y direction (see FIG. 9). Intermediate compression level $d/\sqrt{2}$ offers $\sqrt{2}$-times higher resolution than the closest higher standard resolution level at only 2-times slower scanning speed.

Compression Scanning Protocol

For every square, scanning consists of a prescan and a final scan. The prescan is used to determine the resolution of the square, and the subsequent final scan records the topographical data of the square.

Prescan

Figure 5:
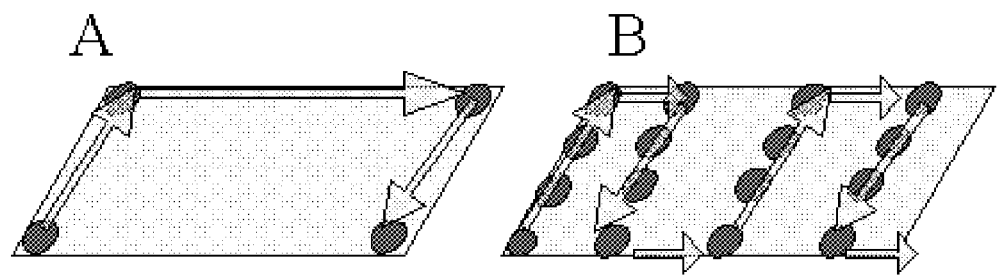
FIG. 5 shows the number of pixels in an exemplary prescan (A) and final scan (B)

In the prescan, the probe is driven by the SCIM controller and interrogates each of four corner pixels of the square in turn, as shown in FIG. 5A. The computer is configured to process the probe signals and compare the subject surface height (z) values for each of the four corner points. The maximum difference between these four pixels is compared with a defined "roughness" z height threshold. If the difference is greater than the threshold then the square region bounded by the corner points is rough and so a high resolution final scan is to be used, otherwise low resolution is used.

Final Scan

The final scan records topographical data after the prescan. The final scan images the same square region at a number of discrete positions. The spacing between the final scan imaging positions is dependent on the compression level elected by the computer following the prescan. As can be seen from FIG. 5B, the square imaged at the four boundary corners in FIG. 5A is imaged in a final scan at 16 positions. The different compression levels used to scan the regions of the subject surface to collect the topographical data represent the image resolutions of the resultant image. It is also possible to use only a single compression level, such that the same resolution is used everywhere in the image.

The following Examples illustrate the invention.

Apparatus and Methods Used

Solutions

The standard external solution used for scanning of hippocampal neurons (Example 2) contained (mM): NaCl 145; KCl 3; $CaCl_2$ 2.5; $MgCl_2$ 1.2; Glucose 10; HEPES 10. The loading solution used for FM1-43 staining of synaptic boutons contained (mM): NaCl 103; KCl 45; $CaCl_2$ 2.5; $MgCl_2$ 1.2; Glucose 10; HEPES 10 and 10 µM FM1-43 (Molecular Probes). PBS (composition, in mM, NaCl 137, KCl 2.7, $KH_2PO_4$ 1.5, $Na_2HPO_4$ 4.3, pH 7.2) was used as external solution for high resolution imaging of the fixed cultured organ of Corti explants. Nanopipettes were filled with PBS in all experiments. Both the external and pipette solutions were filtered using sterile 0.2 µm Acrodisc Syringe Filters (Pall Corporation, USA) to minimize blockage of nanopipettes during imaging.

Cultured Organs of Corti (see Example 1)

Organ of Corti explants were dissected from mice at postnatal days 2-4 (P2-4) and placed in glass-bottom Petri dishes (WillCo Wells, Netherlands). The explants were cultured in DMEM medium supplemented with 25 mM HEPES and 7% fetal bovine serum (Invitrogen, Carlsbad, Calif.) at 37° C. and 95% air/5% $CO_2$. Cultured organs of Corti were used in experiments within 1-5 days. In some experiments, 10 µg/ml of ampicillin (Calbiochem, La Jolla, Calif.) was added to the medium. The organs of Corti from left and right cochleae of a mouse were processed simultaneously. The cultured organs of Corti were immersed in 2.5% glutaraldehyde in 0.1M cacodylate buffer supplemented with 2 mM $CaCl_2$ for 1-2 hours at room temperature. One cochlea was used for HPICM imaging while the other one was used for SEM imaging.

Hippocampal Neurons Preparation (see Example 2)

Hippocampal neurons were prepared as described in Shah et al, J. Neurophysiol. 2000; 83:2554-2561, and cultured on glass coverslips to allow confocal microscopy. Cells were kept in an incubator at 37° C. and 95% air/5% $CO_2$ for 1 to 2 weeks. Once out of the incubator, cells were washed with standard external solution and scanned within two hours, at room temperature. For combined topography/fluorescent measurements hippocampal neurons were first incubated for 90 seconds at room temperature in 1.5 ml of loading solution to stain synaptic boutons with FM1-43 and then washed three times with a total volume of at least 10 ml of standard external solution and left for 15 min in the dark before imaging.

HPICM Probes

Nanopipettes were pulled from borosilicate glass (O.D. 1 mm, I.D. 0.58, Intracell, UK) using a laser-based puller Model P-2000 (Sutter Instruments Co., USA). Two different pipettes were used: Standard pipettes, displayed resistances ranging from 100 MΩ to 150 MΩ (measured in a standard external solution) and inner diameter of ≈100 nm. These pipettes were used for scanning hippocampal neurons (Example 2). High resolution images of stereocilia bundles in cochlear hair cells (Example 1) were recorded with sharp pipettes, with resistances of ~400 MΩ (range 300-500 MΩ) and estimated inner diameter of ≈30 nm. The pipette inner diameters are estimated from the pipette resistance using a half cone angle of 3°.

Instruments

The hopping technique requires careful damping of mechanical vibrations that arise from the large, rapid vertical motions of the Z-piezo with the attached probe. The apparatus has the nanopipette moving in the Z-direction while the sample is mounted on a separate piezo system moving it in the X-Y plane (FIG. 1). This separation of Z-piezo from the X-Y piezos is required to prevent mechanical interference. The circuit that drives the movement of the piezo along the Z-axis is then tuned to allow a non-oscillating step response as fast as 1 ms.

All experiments were performed using a SICM scanner controller (Ionscope, UK) and scan head (Ionscope, UK). Two different heads were used for imaging (FIG. 1). Scan head #1 consisted of a PIHera P-621.2 XY Nanopositioning Stage (Physik Instrumente (PI), Germany) with 100×100 μm travel range that moved the sample and a LISA piezo actuator P-753.21C (PI, Germany) with travel range 25 μm for pipette positioning along the Z-axis. Coarse positioning was achieved with translation stages M-111.2DG (XY directions) and M-112.1DG (Z-axis) (PI, Germany). The Z piezo actuator was driven by a 200 W peak power low voltage PZT amplifier E-505 (PI, Germany), while the XY nanopositioning stage was driven by 3×14 W amplifier E-503 (PI, Germany). Scan head #2 consisted of a P-733.2DD Ultra-High-Speed, XY Scanning Microscopy Stage (PI, Germany) customized for 10×10 μm travel range (XY movement of the sample) and a LISA piezo actuator P-753.21C customized for 5 μm travel range (PI, Germany) that moved the nanopipette along Z-axis. A translation stage M-112.1DG with a travel range of 25 mm (PI, Germany) was used for coarse positioning of the pipette in the Z-axis. All piezos were driven by 200 W peak power low voltage PZT amplifiers E-505 (PI, Germany). Scan head #2 was used for high resolution scanning of the cochlear hair bundles. All other experiments were performed using scan head #1.

All piezo elements in both scan heads were operated in capacitive sensor-controlled closed-loop using Sensor & Position Servo-Control Module E-509 (PI, Germany). Scan heads were placed on the platform of inverted Nikon TE200 microscope (Nikon Corporation, Japan). The pipette current was detected via an Axopatch 200B (Molecular Devices, USA) using a gain of 1 mV/pA and a low-pass filter setting of 5 kHz. The internal holding voltage source of the Axopatch-200B was used to supply a DC voltage of +200 mV to the pipette. The outputs of the capacitive sensors from all three piezo elements were monitored using Axon Digidata 1322A (Molecular Devices, USA) and Clampex 9.2 (Molecular Devices, USA).

The LCS-DTL-364 laser diode (473 nm wavelength, Laser Compact, Moscow, Russia) was used to provide the excitation light source during confocal microscopy measurements. The fluorescence signal was collected using oil-immersion objective 100× 1.3 NA, an epifluorescent filter block and a photomultiplier with a pinhole (D-104-814, Photon Technology International, Surbiton, England).

Hopping Mode Protocol

The vertical Z positioning of the hopping probe and the movement of the sample in the XY plane were controlled by a SICM controller (Ionscope, UK) utilising a SBC6711 DSP board (Innovative Integration, USA) at a sampling frequency of 20 kHz. The measurement of height at each imaging point consisted of three phases. First, the probe was withdrawn from its existing position either by a specified distance or to a specified absolute height level. Second, the vertical position of the probe was maintained for 10 ms, while the XY Nanopositioning Stage completed the sample's movement to a new point in the XY plane. During this time a reference current $I_{REF}$ was measured as an average of the DC current through the HPICM probe. Finally, the probe was lowered at constant fall rate of 100 nm/ms (for a standard pipette) or 30 nm/ms (for a sharp pipette) while monitoring the difference in current, $\Delta I$, between $I_{REF}$ and the instantaneous value of current through the probe $I_{MV}$. As soon as $\Delta I$ exceeded the specified value of the setpoint, $I_s$, during at least four consecutive sample periods (that is 200 μs), the vertical position of the probe was saved into the corresponding image pixel and the probe was quickly withdrawn by a specified hop amplitude to start a new measurement cycle. $I_S$ values ranged from 0.25 to 1% of $I_{REF}$.

See "Approach curves" below for details on current measurement precision and vertical resolution.

During adaptive imaging, the final topography of a "512× 512" pixels image was actually acquired in squares of different sampling/resolution depending on the roughness observed within each square. The sizes of the squares were 4×4, 8×8, 16×16, and 32×32 pixels, while the resolution levels were equivalent to 512×512, 256×256, 128×128, 64×64, 32×32, 16×16 pixels per whole image.

Figure 2:
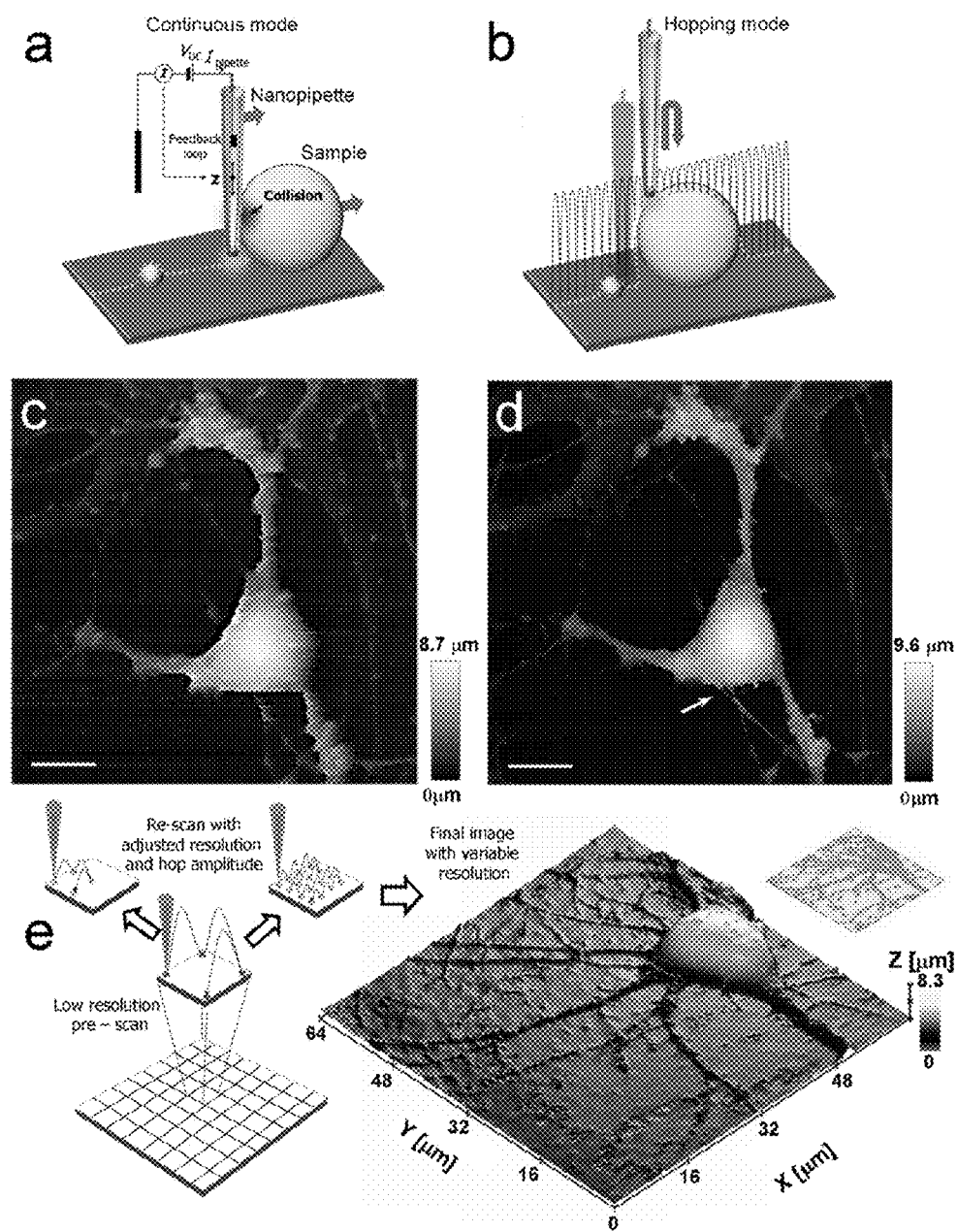
FIG. 2 illustrates the problem with conventional SICM, (b) illustrates the hopping mode SICM to overcome the problem, (c) and (d) show scans of hippocampal neurons with conventional raster scan (c) and hopping mode SICM (d), (e) illustrates the principles of hopping mode SICM.

One or two different resolution levels were used, for the images in this study. In each square, a quick pre-scan at 4 corner points (FIG. 2e) was performed using a specified hop amplitude of 3 to 6 μm to determine the roughness, $R_{PP}$, and highest point $H_{max}$. Each square was then re-scanned at a higher resolution level if the estimated $R_{PP}$ exceeded the user defined roughness threshold, $R_T$, otherwise the lower resolution level was used. In some cases, we simply imaged all squares with the same level of resolution either to produce a fast preview image (at a low resolution) or to ensure that no details were lost during adaptive scanning (a high resolution control). Large area images of hippocampal neural network at a high resolution (Example 2) were typically taken with a pre-scan hop amplitude of 5 μm, square size of 4×4 pixels, two resolution levels of 256×256 and 128×128 pixels and $R_T$ value of 100 nm. The pre-scan hop amplitude was reduced to 3 μm and the $R_T$ value to 25 nm for the high resolution scans of hair bundles (Example 1). For medium resolution imaging of dendritic networks (Example 2) the square size was typically increased to 8×8 pixels and the resolution levels of 128×128 and 64×64 were used. The overall time required to image the specimen varied significantly depending on the proportion of the sample area exhibiting high roughness. Generally speaking, imaging duration increased with slower probe fall rates (i.e. with sharper probes), smaller size of scan squares, higher pre-scan hop amplitude and higher resolution level. High resolution images of elaborate samples took between 30 and 40 min. The images of less elaborated areas took 5 to 12 min. Note that at each imaging square the upward hopping typically starts at the different initial heights. Therefore, the algorithm allows us to "climb" up a tall sample without an excessive increase of the amplitude of the hops in each imaging square.

Fluorescence Measurement

After being kept for 15 min in the dark, dishes with hippocampal neurons were placed onto the XY nanopositioning stage in the scan head. Using an 10× objective and X, Y and Z translation stages for coarse movement, the HPICM pipette was positioned over the region of interest and lowered down to a safe distance of about 200 μm from the sample surface. Then the 100× oil-immersion objective was chosen and an automated approach algorithm brought the HPICM probe to a distance of about one pipette radius from the sample surface. The XY position of the whole microscope platform was then adjusted to align the tip of the pipette with the confocal laser beam. To minimise photo-bleaching, fluorescence images of the selected area were recorded within 3 min separately from topography. The HPICM probe was retracted by ~24 μm to prevent pipette—sample collisions during rapid fluorescence acquisition. Topography imaging of the same area was performed immediately after obtaining a fluorescent image.

Scanning Electron Microscopy

The fixed organs of Corti were dissected in ultra-pure distilled water, dehydrated in a graded series of acetone, and critical-point dried from liquid $CO_2$. Then, the specimens were sputter-coated (EMS 575X Sputter Coater, Electron Microscopy Sciences, USA) with 5.0 nm of platinum under control with a film thickness monitor (EMS 150). The coated specimens were observed with a field-emission SEM (S-4800, Hitachi Technologies, Japan) at low accelerating voltage (1-5 kV).

Image Processing

Raw height data obtained with varying resolution were interpolated using bilinear interpolation to produce a final image of 512×512 pixels. When required, the images were corrected to remove stripes caused by small displacement of XY nanopositioning stages in Z-axis and further corrected for the slope present in the preparations to aid visualisation of fine details.

Approach Curves

The experimental approach curve demonstrates that the minimum reliably detectable current drop, expressed as a percentage of the reference current recorded far from surface ($I_{REF}$), ranges from 0.25% (for a standard pipette of 100 nm inner diameter) to 0.75% (for a sharp pipette of 30 nm inner diameter). Because of the high signal-to-noise ratio of the current measurements in our experimental setup, the estimated vertical resolution at a 1% setpoint is 9 nm for a standard pipette and 6 nm for a sharp pipette. The real vertical resolution depends on the lateral dimension of the feature. The vertical sensitivity of the 30 nm pipette can be further improved to ~3 nm using a 1 kHz low-pass filter instead of a standard 5 kHz. However, this would reduce the response time of the feedback control.

EXAMPLE 1

Figure 6:
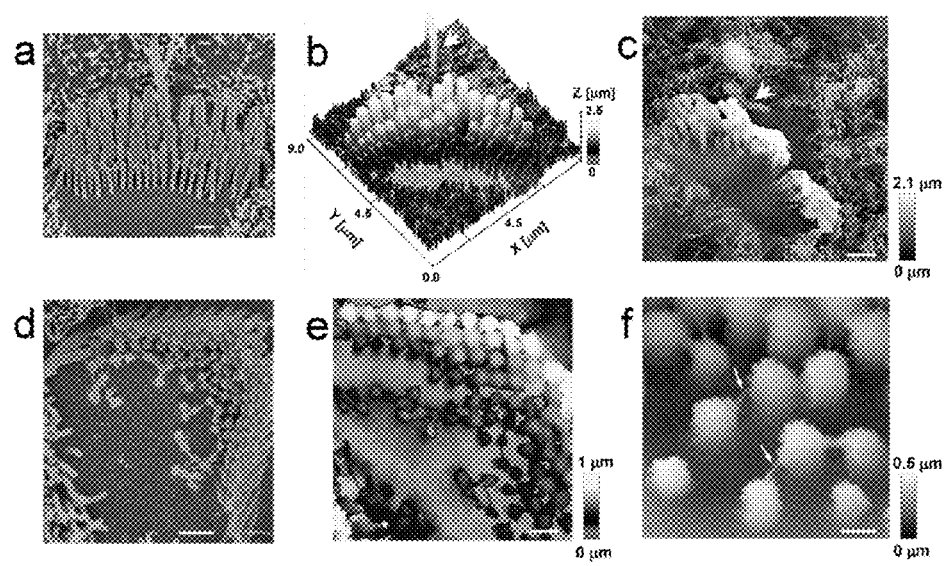
FIG. 6 shows images vertically protruding mechanosensitive stereoclia of auditory hair cells, produced with hopping mode SICM.

To determine the robustness of the technique, mechanosensitive stereocilia of the auditory hair cells in the cultured organ of Corti explants were imaged. Several attempts have been made previously to image stereocilia with AFM or raster scan SICM, but these studies never resolved even a gross structure of the stereocilia bundle. Specimens were fixed to compare images obtained with the present invention (Hopping Probe Ion Conductance Microscopy—HPICM) and a scanning electron microscope (SEM) (FIG. 6a-c). HPICM resolved stereocilia very well, including the shortest ones with a diameter of ~100 nm or less (FIG. 6b,c). A kinocilium (true cilium), present in these young postnatal auditory hair cells, was also visualised (FIG. 6c, arrowhead). To explore the resolution limits of HPICM, fine extracellular filaments (links) that interconnect stereocilia and are crucial for their mechanosensory function, were imaged. These links could be as small as ~8-10 nm in diameter. In wild type hair cells, most of the links are inaccessible to the HPICM probe, because it approaches vertically to the bundle. Therefore, we used abnormally short, but still mechanosensitive, stereocilia of Shaker 2 mice (FIG. 6d-f). The HPICM probe, with an inner diameter of ~30 nm, was able to resolve these links that appeared as features of 16±5 nm (n=37) in diameter (FIG. 6f). HPICM uses the same sensor as SICM and, therefore, shares the same physical principles that determine lateral and vertical resolution. The apparent diameter of the same stereocilia links on SEM images was 22±5 nm (n=41). After subtraction of the platinum coat thickness (5 nm on both sides), an independent estimate of 12±5 nm was obtained for the diameter of these links. The HPICM and SEM observations are therefore in excellent agreement, demonstrating the high resolution that is attainable.

EXAMPLE 2

Figure 7:
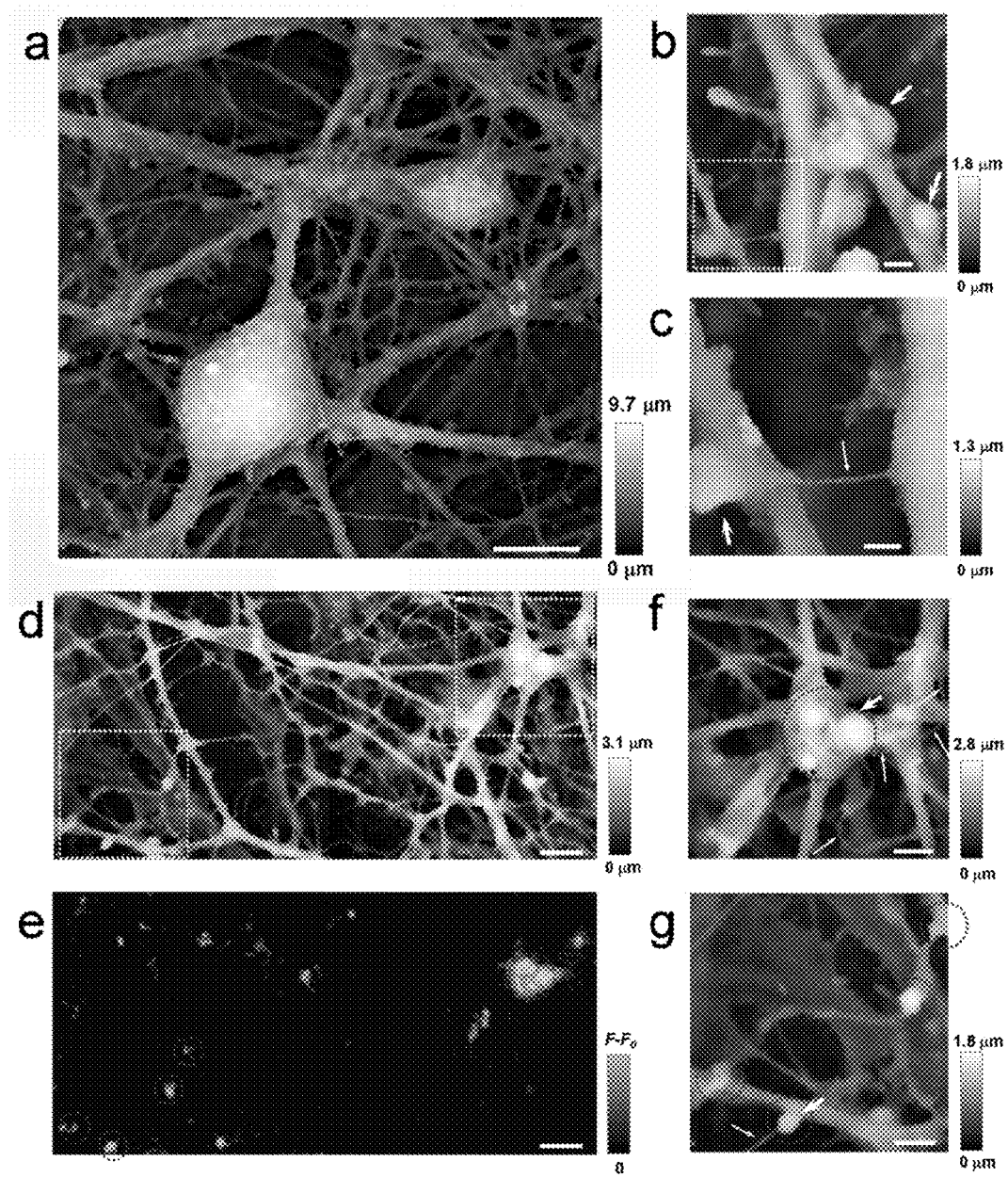
FIG. 7 shows images of live hippocampal neurons.

Movements of live cells impose additional requirements for rapid imaging. To test whether adaptive HPICM is fast enough to visualise live complex cellular structures, live hippocampal neurons were examined (FIG. 7a), which represent an unmet challenge for any scanning probe microscopy because of the complex three dimensional shapes that are formed by axons and dendrites. HPICM revealed structures that resembled synaptic boutons (FIG. 7b, c) as well as very fine (down to 50-60 nm in diameter) processes, tentatively identified as axons (FIG. 7b,c). This specimen was labelled with FM1-43, an activity-dependent marker that is accumulated in synaptic vesicles during cycles of endo- and exocytosis, and recorded the topography and the FM1-43 fluorescence of the same sample. Whenever a fluorescent signal was observed, it was also possible to identify varicosities in the images (FIG. 7d-g). The size and shape of these varicosities is consistent with the geometry expected of synaptic boutons. It is thus clear that the speed of adaptive HPICM is sufficient to generate a "snapshot" of axons, dendrites and boutons in these complex live networks in spite of relatively slow (on a time scale of tens of minutes) re-arrangement and migration of the cells that do occur in this preparation. Faster dynamics can be followed by imaging of a smaller area and/or decreasing the resolution.

EXAMPLE 3

Mapping of Ion Channels on Living Cells

Mapping ion channels on cell membrane has been a great interest in biology. With hopping mode, live neurons were stimulated to open their ion channels by depolarisation of the cell membrane. The response of neurons was measured using fluorescence detection with simultaneous scanning. The cells were loaded with fluo4 dye which is sensitive to high calcium concentration and the pipette was filled with solution that contained potassium. Potassium ions released from the pipette tip depolarised the cell membrane, while the pipette close to the surface, causing the cell membrane to open its calcium channels. Calcium ions entered the cell through these channels and combined with fluo4, causing the dye to become fluorescent.

Figure 11:
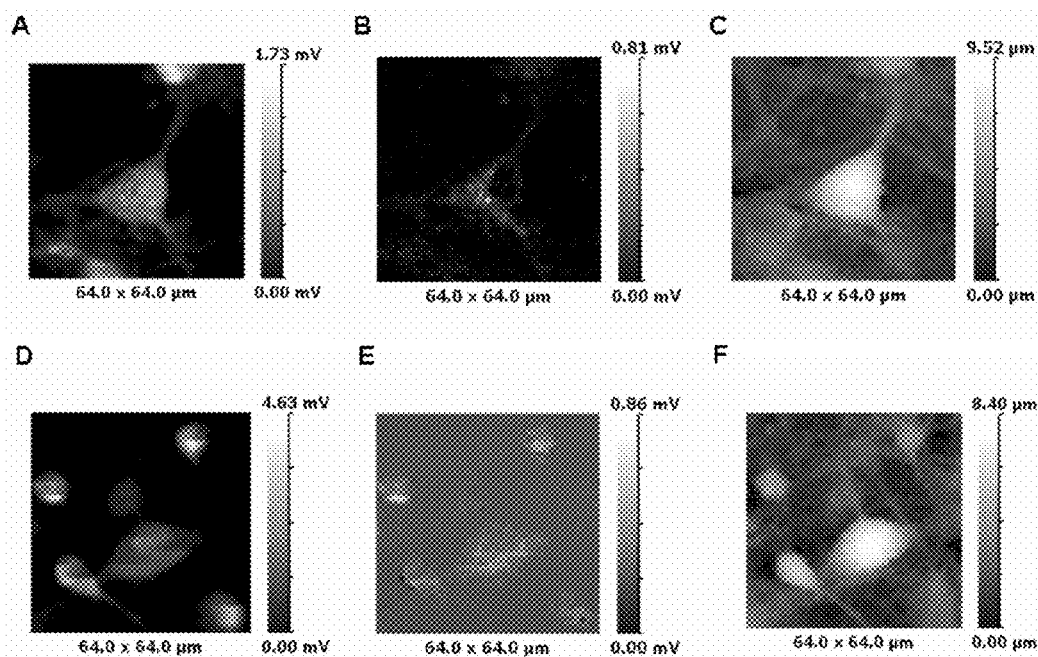
FIG. 11 shows images taken of live hippocampus neuron cells during fluorescence mapping, where (A,D) are excited fluorescence SCIM images of neurons, (B,E) are differential fluorescence images between the excited and reference fluorescence images of the neurons and (C,F) are topographical SICM images of neurons.
Figure 12:
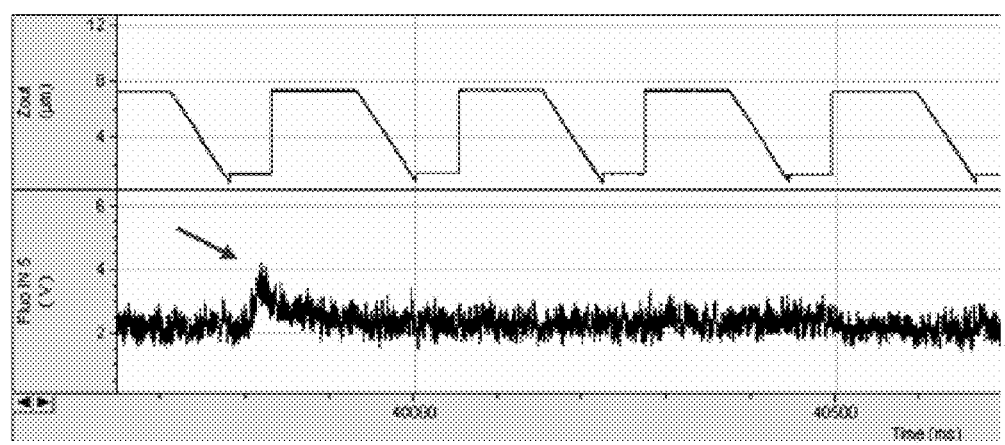
FIG. 12 is a simultaneous fluorescence signal recorded while scanning on live hippocampus neurons, the arrow showing a burst in the signal while the pipette was held close to the cell membrane, which depolarised the cell membrane.
Figure 13:
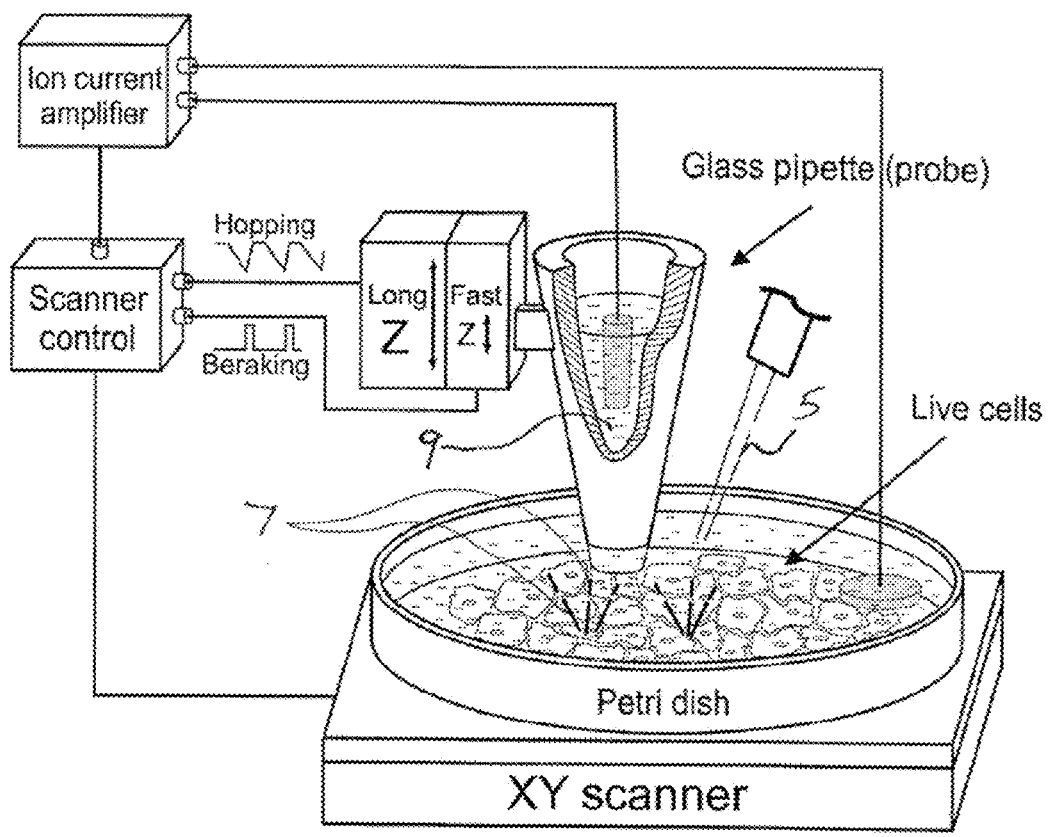
FIG. 13 shows the configuration of an SICM system of the subject invention.

A negative voltage potential in the pipette was used to keep potassium inside the tip prior to the scan. During scan, a positive voltage was used for dosing potassium out of the pipette during scan. The hopping setpoint used was between 0.5%-0.7% drop of the reference ion current and the hopping amplitude was between 5~7 μm. At every image point, the pipette was positioned 80 nm above the cell membrane for 80 ms. In this period, potassium ions released from the pipette locally depolarised the cell membrane and the excited fluorescence signal, due to influx of calcium, was collected as shown in FIG. 11 A&D. In order to remove the background fluorescence, a reference signal measured when the pipette was far away from the membrane at each pixel, was subtracted from the excited fluorescence signal to produce a differential signal (FIG. 11 B&E). From these images, it can be clearly seen that part of neuron cell body and dendrites were depolarised by the pipette's stimulation, and the ion channels were mapped as a result. The excited fluorescence signal was recorded and burst was observed while the pipette was close to the cell membrane, which is indicated of the opening of ion channels, as shown in FIG. 12.

The content of all publications described above is incorporated herein by reference.

We claim:

1. An apparatus for carrying out scanning probe microscopy, comprising:
   (i) a scanning probe;
   (ii) means for measuring and/or controlling the distance of the tip of the probe from a surface to be scanned, wherein the means for measuring and/or controlling the distance of the tip of the probe comprises two piezo actuators of different response times;
   (iii) means for moving the probe laterally relative to the surface.

2. The apparatus according to claim 1, which is a scanning ion conductance microscope.

3. The apparatus according to claim 1, wherein the first piezo actuator has a travel range of at least 100 μm, and the second piezo actuator has a travel range less than 50 μm.

4. The apparatus according to claim 1, wherein the second piezo actuator has a travel range of no more than 25 μm.

5. The apparatus according to claim 1, wherein the first piezo actuator has a travel range of at least 100 μm.

6. The apparatus according to claim 1, wherein the second piezo actuator has a travel range of less than 50 μm.

\* \* \* \* \*